United States Patent
Cooley

[15] 3,651,878
[45] Mar. 28, 1972

[54] ROLAMITE SCALE CONSTRUCTION
[72] Inventor: Gordon A. Cooley, Chicago, Ill.
[73] Assignee: The Borg-Erickson Corporation, Chicago, Ill.
[22] Filed: Jan. 8, 1970
[21] Appl. No.: 1,414

[52] U.S. Cl. ..........................177/230, 177/234, 177/DIG. 9
[51] Int. Cl. ..................G01g 3/08, G01g 21/02, G01g 23/26
[58] Field of Search ......................177/230, 234, 225, DIG. 9

[56] References Cited

UNITED STATES PATENTS

| | | | |
|---|---|---|---|
| 2,098,845 | 11/1937 | Weber et al. | 177/234 X |
| 3,084,755 | 4/1963 | Kaiser | 177/230 |
| 3,405,775 | 10/1968 | Grady et al. | 177/230 X |
| 2,622,938 | 12/1952 | Van Duyn | 177/DIG. 9 |

FOREIGN PATENTS OR APPLICATIONS

| | | | |
|---|---|---|---|
| 529,764 | 8/1956 | Canada | 177/234 |
| 1,123,734 | 6/1956 | France | 177/DIG. 9 |
| 1,449,206 | 7/1966 | France | 177/DIG. 9 |
| 151,626 | 1922 | Great Britain | 177/230 |

*Primary Examiner*—Robert S. Ward, Jr.
*Attorney*—Hume, Clement, Hume & Lee

[57] ABSTRACT

There is disclosed a bathroom scale comprising a base member, a platform member mounted for free vertical movement relative to the base member, a flexible Rolamite band located between the platform member and the base member, transfer means connected to the base member and adapted to transfer a load imposed upon the platform to the roller band wherein the load on the platform causes a movement of the roller band indicative of the weight of the load, and an indicator operably connected to the Rolamite band indicating the weight of the load.

20 Claims, 6 Drawing Figures

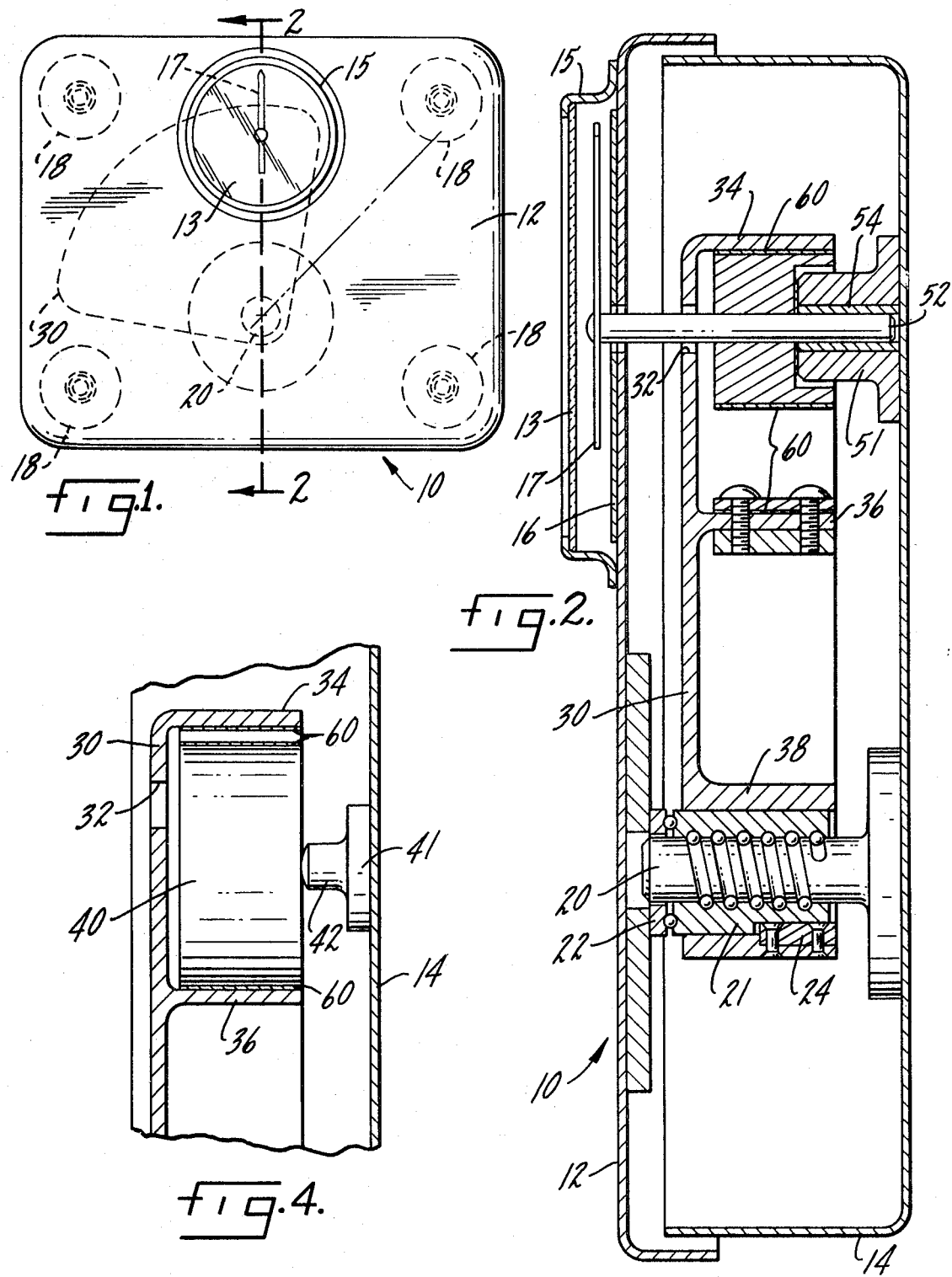

PATENTED MAR 28 1972
3,651,878
SHEET 2 OF 2
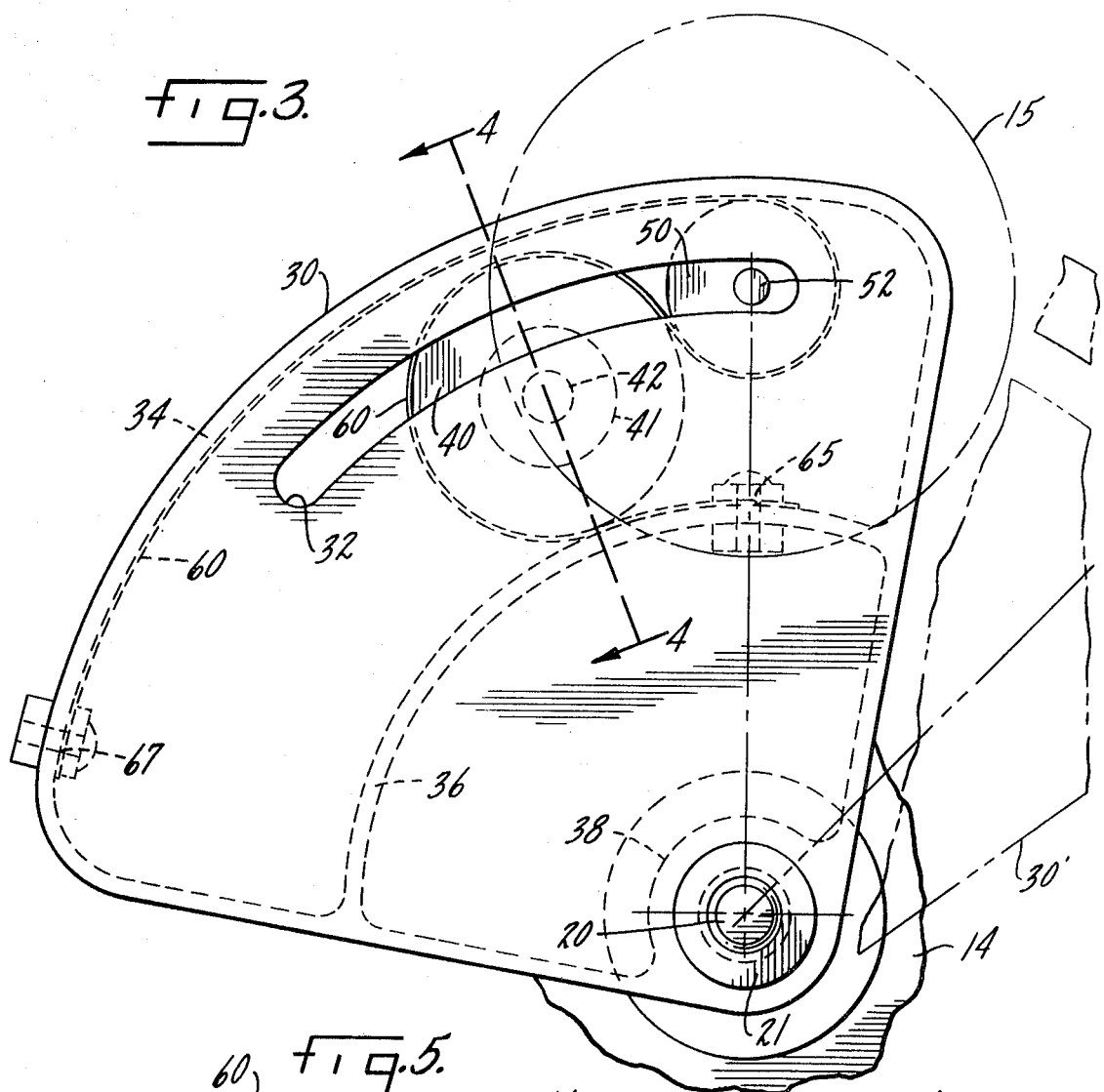
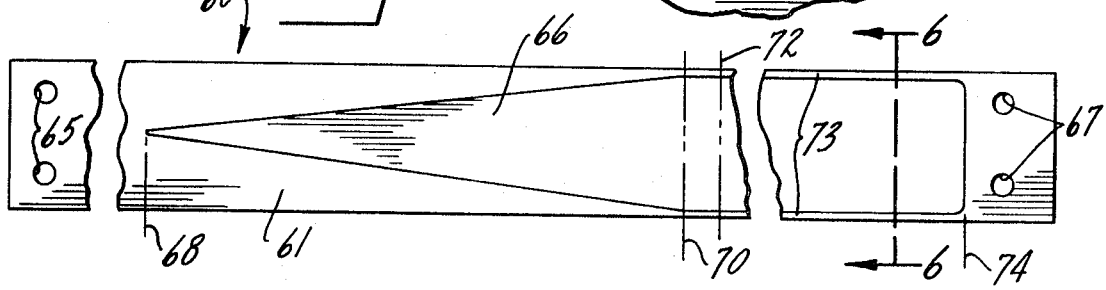
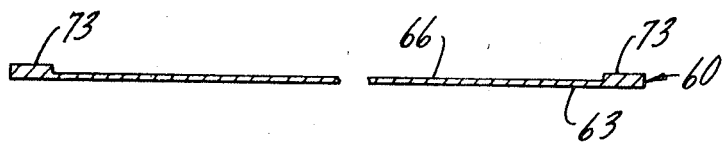
INVENTOR.
Gordon A. Cooley
BY Hume, Clement, Hume & Lee
Attorneys.

ROLAMITE SCALE CONSTRUCTION

BACKGROUND OF THE INVENTION

The present invention relates to weighing scales and, more particularly, to bathroom scales comprising the Rolamite principle.

A great number of bathroom scales are now available and the prices thereof range from a few dollars to substantial sums of money. To some extent, the accuracy of the scale is related to the price charged therefor. Most of the scales, however, and particularly those that are low priced, have a considerable degree of error and further, precise indication of the magnitude of any given weight may vary from day to day with the same scale. It has also been found that different samples of the same model will provide different weight indications for a given predetermined weight. The user of these scales then cannot expect great accuracy and must also appreciate that the margin of error is variable and may shift from day to day.

One of the important limitations in the less expensive bathroom scales is that in the less expensive models the platform and its support levers that transfer a weight imposed upon the platform to an indicator dial are relatively unstable and a fair degree of accuracy in the weight indication can be obtained only when the weight is properly centered on the platform. Such centering of the weight cannot be expected when persons using the scales step on and off hurriedly and do not understand that their weight should be properly centered on the platform. As a result, off-center loading and any tilting of the platform as a result of improper position of the load will cause binding and inaccuracy in the weight indications.

Another problem in obtaining accurate weight indications is that the force transmitted by the platform is normally directed to a spring and as the spring ages from continuous use, the inherent force transmitted from the spring to the readout dial varies, and this variation destroys the accuracy of the scale. By utilizing the Rolamite principle in a bathroom scale, there above limitations may be eliminated.

The Rolamite principle is a mechanical design concept developed by the Sandia Laboratory in Albuquerque, New Mexico. The principle is completely described in a research report available from the National Bureau of Standards, United States Department of Commerce entitled "Rolamite: A New Mechanical Design Concept" Research Report No. SC-RR-67-656A, which was published in December of 1967 by the Sandia Laboratory of Albuquerque, New Mexico.

This principle is also described in three United States Patents granted to Donald F. Wilkes and assigned to the United States Atomic Energy Commission, U.S. Pat. Nos. 3,452,175 issued June 24, 1969; 3,452,309 issued June 24, 1969; and 3,471,668 issued October 7, 1969.

The Rolamite principle utilizes a roller band device which substantially eliminates or minimizes sliding friction. In addition, Rolamite devices are easily microminiaturized and are extremely tolerant of production variations.

The basic Rolamite geometry comprises two rolling elements inside parallel guide surfaces, locked in a free rolling, counter-rotating cluster by the elastic constraints of an entwined flexible metallic band under tension. This geometry ensures that the motion of the roller relative to the guide surfaces is accomplished by rolling, not sliding. The Rolamite principle approaches pure rolling in a much closer manner than the other types of bearings and does not require lubrication. This principle will be better understood in conjunction with the disclosed embodiment and further details may be obtained by referring to the above mentioned references.

SUMMARY OF THE INVENTION

The general purpose of this invention is to provide a bathroom scale which embraces all of the advantages of similarly employed scales and possesses none of the aforedescribed limitations. To attain this, the present invention contemplates the utilization of the Rolamite principle in a bathroom scale to provide a means for transferring the weight from a platform to a calibrated dial without encountering appreciable friction. Moreover, the Rolamite band is utilized to provide a calibrated force to enable an accurate readout on an indicator scale.

The bathroom scale of the present invention comprises a base member and a platform member mounted for free vertical movement relative to the base member. A ball screw and nut are located between the platform and the base and are adapted to convert the vertical movement of the platform in response to a load being placed upon it to an axial force. A quadrant lever is rotatably connected to the ball nut and is operable in response to the axial force from the ball nut. A first rotatable member is connected between the base and the platform. A second rotatable member is operably connected between the base and the platform and is adjacent to the first rotatable member. A flexible roller band having its ends secured to the quadrant lever is looped in a generally S-shaped fashion about the first and second rotatable members. Lastly, an indicator is connected to the second rotatable member for giving a readout of the weight on the platform. When a weight is applied to the scale platform, the ball nut rotates and provides a torsional force through the quadrant lever. This force is transmitted to the Rolamite band, thereby producing a second force in opposition to the torsional force and, as these two opposing forces reach a state of equilibrium, the indicator comes to rest showing the weight that is placed upon the platform.

It is therefore an object of the present invention to provide a weighing device particularly useful as a bathroom scale that provides much greater accuracy than the scales now available.

Another object is to provide a bathroom scale that is relatively inexpensive.

A further object is to provide a bathroom scale where an off-center imposition of the load upon the platform will not substantially affect the accuracy of the weight indication provided by the scale.

Still another object is to provide a means in a bathroom scale to accurately calibrated a readout dial so that the proper weight may be indicated.

Yet another object is to provide a bathroom scale that is small and compact and presents a thin and attractive silhouette.

A still further object is to provide a bathroom scale utilizing the Rolamite principle.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a top view of the scale.

FIG. 2 is a side view of the scale taken along the lines 2—2 of FIG. 1.

FIG. 3 is an enlarged orthogonal view of the mechanism utilized in the scale of FIG. 1.

FIG. 4 is a cross-sectional view taken along the lines 4—4 of FIG. 3.

FIG. 5 is a top view, partly in section, of the Rolamite band utilized in FIG. 3.

FIG. 6 is a cross-sectional view of the Rolamite band shown in FIG. 5 taken along the lines 6—6.

DESCRIPTION OF THE PREFERRED EMBODIMENT

Referring now to the drawings wherein like reference characters designate like or corresponding parts throughout the several views, there is shown in FIG. 1 a scale 10. Broadly, the scale 10 comprises a weighing platform 12 mounted upon a base 14 (FIG. 2) for free vertical movement relative to the base. The platform is stabilized by a plurality of linear ball bearing alignment pins 18 and rests upon a ball screw 20. Attached to the ball screw 20 is a quadrant lever 30 which is operably connected to an indicator 15.

Referring now to FIG. 2 and FIG. 3 which constitute the preferred embodiment of Rolamite Scale 10, it can be seen that platform 12 is mounted upon base 14 and rests upon a ball screw 20. The ball screw 20 function as a stationary stud. A nut 21, which may be of the non-circulating variety, is in operable engagement with ball screw 20 and is used to convert the downward motion of the platform into a torsional force. While a ball screw and nut are illustrated, any suitable force transfer means may be utilized. Located within platform 12 is an indicator 15. The indicator comprises a window 13 through which can be seen the readout dial 16 and an indicator dial hand 17. Indicator dial hand 17 is connected to a shaft 52. Shaft 52 is connected to a roller 50. Roller 50 is rotatably connected to base 14 by a suitable connection means 51. To facilitate the rotation of shaft 52, a low friction bearing 54 may be interposed between shaft 52 and connecting 51. A second roller 40 is rotatably mounted by suitable connecting means 41 adjacent to roller 50. It will be noted that the diameter of roller 40 is greater than the diameter of roller 50. Roller 40 is mounted upon a shaft 42 and rotates freely.

Connected to ball nut 21 is a quadrant lever 30. Quadrant lever 30 is generally planar but contains downwardly protruding ribs 34, 36 and 38. Ball screw 20 functions as a stationary stud mounted to base section 14 of the scale. When a load is placed upon platform 12, the platform moves downwardly. This force is transmitted to a ball thrust bearing 22 to a ball screw 20 thereby causing ball nut 21 to rotate. This rotation transmits the downward force of the load into a torsional force and thereby causing quadrant lever 30 to rotate as shown in FIG. 3. As will be explained below, this causes roller 50 to rotate, thereby rotating roller band 60 which then causes indicator dial hand 17 to also rotate.

Referring to FIG. 3, the solid lines show quadrant lever 30 in its position when no load is applied to the platform. The dotted lines to the right shown the deflection of quadrant lever 30 now designated as 30' when a weight is placed upon the platform. A slip fit key 24 may be provided between ball nut 21 and quadrant lever 30 to facilitate the free axial movement between the outer diameters of the ball nut 21 and the quadrant lever 30.

Lastly, a thin flexible band 60 is utilized to functionally link together quadrant lever 30 and rollers 40 and 50. Flexible roller band 60, sometimes referred to as a Rolamite band, comprises a flexible material and, in a preferred embodiment, comprises a hardened spring tempered steel. It will be recognized that other flexible materials such as plastic may also be utilized without departing from the scope of the invention. Referring to FIGS. 5 and 6, it can be seen that roller band 60 comprises a first surface 61 and a second surface 63. Along the first surface, a tapered, depressed segment is placed. One such manner of causing this depressed segment is to chemically mill the surface of the band. Preferably, the shape of the depressed segment has a tapered cross-sectional area. After chemically milling the band, a small ridge 73 remains on each side of the depressed segment. It will be recognized by one skilled in the art that rather than using a depressed segment having a tapered cross-sectional area, band 60 may be formed by a thin flexible band having a tapered cross-sectional area along its entirety. If there were no tapering, roller band 60 would then function as a constant force spring and could not be utilized to calibrate indicator 15.

After milling the band 60, the band 60 must be preformed in order to enable a tension force to be present when it is fastened to the quadrant lever 30. This performing requires that the band be shaped into a circular configuration wherein the first surface 61 of the band 60, having the depressed segment forms the inner surface of the prestressed band. It is necessary that the prestress radius of the band be smaller than the radius of the ridge 34 of the quadrant lever 30. For example, in an exemplary embodiment, if the ridge 34 had a radius of 5 inches then the band 60 would be preformed into a circular configuration having a radius of approximately 3 3/16 inches. This performing will enable the band 60 to follow the contour of the ridge 34 of the quadrant lever 30 as shown in FIG. 3.

Referring again to FIG. 3, it can be seen that after performing the band 60, a first end 67 is fastened to the ridge 34 of the quadrant lever 30. The roller band 60 is looped in a generally S-shaped fashion about roller 50 and roller 40 and is then fastened to ridge 36 of quadrant lever 30. A second end 67 of the band 60 is fastened to the ridge 36 of quadrant lever 30. In placing the roller band 60, it is important to insure that the first surface 61 is in contact with roller 50 and that roller 50 is able to physically engage the depressed segment 66.

The operation of scale 10 will now be explained with reference particularly to FIGS. 2 and 3. When a load is placed upon platform 12, the platform moves downwardly. Ball screw 20 functions as a stationary stud mounted on base section 14. However, ball nut 21 rotates thereby causing a torsional force upon quadrant lever 30. Quadrant lever 30 thereby rotates clockwise in response to the force. It will be readily recognized that the direction of rotation is unimportant and that by utilizing an oppositely threaded ball screw, the direction of rotation could be reversed. Slit 32 in quadrant lever 30 allows the quadrant lever to pass over rollers 40 and 50 without interfering with their rotation. The movement of quadrant lever 30 causes a rolling movement of roller band 60 as explained in the Wilkes patents. This rolling movement of roller band 60 causes roller 50 to rotate thereby rotating shaft 52 and indicator dial hand 17. The force produced by roller band 60 in conjunction with the Rolamite principle causes a torque which is opposite in direction to the torque produced by quadrant lever 30. When these two torques reach a point of equilibrium, the indicating dial hand 17 stops moving and the weight of the load may be read on readout dial 16. When the load is removed, the forces present are released and the dial returns to zero and quadrant lever 30 returns to its original position.

Depending upon the weight applied, the rotation of quadrant lever 30 and the subsequent force created by roller band 60 varies. The variation of this force is determined by a portion of the depressed segment 66 which is in operable engagement with roller 50. For example, when the portion of roller band designated as 68 in FIGS. 5 is in contact with roller 50 at the twelve o'clock position, this may indicate 300 pounds of pressure on the platform 12. If point 70 of FIG. 5 were in the twelve o'clock position with relation to roller 50, this would indicate approximately 15 pounds of pressure on the platform. Likewise, if point 72 were in contact with the twelve o'clock position of roller 50 then this would be indicative of zero weight on platform 12. It can be seen that since the depressed segment 66 is tapered any intermediate weight between 15 and 300 pounds could also be registered. As explained in the Wilkes patents, and in the Sandia Laboratory article, the depressed segment 66 of roller band 60 causes the variation in forces depending upon the cross-sectional area of the depressed segment. The force produced by roller band 60 varies inversely with the cross-sectional area of the depressed segment 66. It will also be recognized by one skilled in the art that a force is only produced by roller band 60 when the two rollers around which it is looped are of differing diameters. For proper operation, the diameter of roller 50 must be less than the diameter of roller 40. Formulas for computing the various forces required depending upon the length of the band utilized and the material utilized may be found in the Sandia Laboratory report.

One specific embodiment of the Rolamite scale 10 may employ the following exemplary dimensions and material but if will be recognized by one skilled in the art that many modifications may be made therein without departing from the scope of the invention. All dimensions are in inches unless otherwise indicated:

| | | |
|---|---|---|
| Diameter of Roller 40 | = | 1.992 |
| Diameter of Roller 50 | = | 1.242 |
| Radius of Rib 34 | = | 5.000 |
| Radius of Rib 36 | = | 2.875 |
| Radius of Slit 32 | = | 4.375 |
| Length of Roller Band 60 | = | 15.054 approx. |
| Width of Roller Band 60 | = | 1.000 |
| Thickness of Roller Band 60 | = | 0.0085 |
| Depth of depressed segment 66 | = | 0.0065 |
| Width of Rib 73 | = | 0.030 |

| | | |
|---|---|---|
| Length of depressed segment 66 Reference Point 68 to Reference Point 70 | = | 3.731 |
| Reference Point 68 to Reference Point 72 | = | 3.927 |
| Reference Point 72 to Reference Point 74 | = | 8.334 approx. |
| Modulus of Elasticity of Roller Band 60 | = | 30 × 10⁶ |

In summary, therefore, the Rolamite principle is utilized to provide a frictionless means for creating a force created by roller band 60 which opposes the force set up in ball screw 20 by a load being placed upon the scale platform 12. When the weight is placed upon platform 12, this pushes ball nut 21 down thereby converting the downward force on the platform 12 to a torsional force and thereby rotating quadrant lever 30 in a clockwise direction. This force then causes roller band 60 to move frictionlessly and create a force which opposes the force being transmitted by the quadrant lever 30. The movement of roller band also drives dial hand 17 over the readout dial 16 and as the force created by roller band 60 reaches a state of equilibrium with the force transmitted by ball screw 20 through quadrant lever 30, the indicating dial hand 17 comes to rest over a line on dial 16 indicating the weight.

It should be understood, of course, that the foregoing disclosure relates only to a preferred embodiment of the invention and that numerous modifications or alterations may be made therein without departing from the spirit and the scope of the invention as set forth in the appended claims. What is claimed is:

1. A bathroom scale comprising:
 a base member;
 a platform member mounted for free vertical movement relative to said base member;
 a flexible roller band between said platform member and said base member wherein the surface of said roller band comprises a tapered cross-sectional area;
 transfer means connected to said base member and adapted to transfer a load imposed upon said platform to said roller band wherein said load on said platform causes a movement of said roller band indicative of the weight of said load; and
 indicator means operably connected to said roller band for indicating said weight of said load.

2. A bathroom scale comprising:
 a base member;
 a platform member mounted for free vertical movement relative to said base member;
 a flexible roller band between said platform member and said base member wherein said roller band comprises a depressed segment having a tapered cross-sectional area;
 transfer means connected to said base member and adapted to transfer a load imposed upon said platform to said roller band wherein said load on said platform causes a movement of said roller band indicative of the weight of said load; and
 indicator means operably connected to said roller band for indicating said weight of said load.

3. The bathroom scale of claim 2 wherein said transfer means comprises:
 a first member adapted to convert said vertical movement of said platform to a torsional force in response to said load on said platform; and
 lever means rotatably connected to said first member and operable in response to said torsional force to impart a rolling movement to said roller band.

4. The bathroom scale of claim 3 wherein said first and second ends of said roller band are secured to said lever means.

5. The bathroom scale of claim 4 further comprising a second rotatable member adjacent to said indicator means wherein said roller band is looped in a generally S-shaped fashion around said second rotatable member and said indicator means, said tapered cross-sectional segment of said roller band being operably engaged with said indicator means and said second rotatable member to produce a second force in opposition to said torsional force.

6. The bathroom scale of claim 5 wherein said second force created by said roller band varies inversely to the cross-sectional area of said tapered segment of said roller band which is in operable engagement with said indicator means.

7. The bathroom scale of claim 6 wherein said cross-sectional area of said depressed segment of said roller band which is in operable engagement with said indicator means comprises a uniform cross-sectional area when said load is removed from said platform.

8. The bathroom scale of claim 7 wherein said roller band comprises a flexible steel band.

9. The bathroom scale of claim 7 wherein said roller band comprises a flexible plastic band.

10. The bathroom scale of claim 8 wherein said depressed segment is formed by chemically milling said surface of said roller band.

11. A bathroom scale comprising:
 a base member;
 a platform member mounted for free vertical movement relative to said base member;
 a first member operably connected between said platform and said base, said first member being adapted to convert said vertical movement of said platform to a torsional force in response to a load placed thereon;
 a lever means rotatably connected to said first member and operable in response to said torsional force;
 a second rotatable member operably connected between said base and said platform;
 a third rotatable member operably connected between said base and said platform, said third rotatable member being positioned adjacent to said second rotatable member;
 a flexible roller band having a first end and a second end, said first and second ends being secured to said lever means and wherein said roller band is looped in a generally S-shaped fashion about said second and third rotatable members; and
 indicator means rotatably connected to said third rotatable member for indicating the weight of said load wherein movement of said lever means in response to said torsional force causes a rolling movement of said roller band thereby producing a second force in opposition to said torsional force and wherein said second force produces rotation of said indicator means.

12. The bathroom scale of claim 11 wherein said roller band comprises a depressed segment having a tapered cross-sectional area wherein said second force created by said roller band varies inversely to the cross-sectional area of said segment which is in operable engagement with said third rotatable member, said second force being indicative of said load on said platform and wherein the movement of said rolling band thereby causes the rotation of said third rotatable member.

13. The bathroom scale of claim 12 wherein the diameter of said second rotatable member is greater than the diameter of said third rotatable member.

14. The bathroom scale of claim 13 wherein said first member comprises a ball screw and nut.

15. The bathroom scale of claim 14 wherein said roller band comprises a flexible steel band.

16. A bathroom scale comprising:
 a base member;
 a platform member mounted for free vertical movement relative to said base member;
 a ball screw and nut operably connected between said platform and said base, said ball screw and nut being adapted to convert said vertical movement of said platform to a torsional force in response to a load placed thereon;
 a lever means rotatably connected to said nut and operable in response to said torsional force;
 a first rotatable member operably connected between said base and said platform;

a second rotatable member having a diameter smaller than the diameter of said first rotatable member operably connected between said base and said platform, said second rotatable member being positioned adjacent to said first rotatable member;

a flexible steel roller band having a first end and a second end, said first and second ends being secured to said lever means and wherein said roller band is looped in a generally S-shaped fashion about said first and second rotatable members, said roller band comprising a depressed segment having a tapered cross-sectional area; and Indicator means rotatably connected to said second rotatable member for indicating the weight of said load wherein movement of said lever means in response to said torsional force causes a rolling movement of said roller band thereby producing a second force in opposition to said torsional force, said second force producing a rotation of said indicator means and wherein the amount of said rotation of said indicator means corresponds to the weight of said load and is determined by the cross-sectional area of said segment which is in operable engagement with said second rotatable member.

17. A bathroom scale comprising:

a base member;

a platform member mounted for movement relative to said base member;

a plurality of adjacent rotatable members located between said platform member and said base member;

a guide means for guiding the rotation of said rotatable members;

a flexible roller band looped under tension in a general S-shaped fashion about said rotatable members;

transfer means adapted to transfer a load imposed upon said platform member to said roller band thereby causing a substantially frictionless movement of said roller band wherein said movement is indicative of the weight of said load; and indicator means operably connected to said roller band for indicating said weight of said load.

18. The bathroom scale of claim 17 wherein a portion of said flexible roller band is fastened to said transfer means.

19. The bathroom scale of claim 18 wherein said guide means are located in said transfer means.

20. The bathroom scale of claim 19 wherein said transfer means comprises:

a ball screw and nut operably connected between said platform member and said base member, said ball screw and nut being adapted to convert said movement of said platform to a torsional force in response to a load placed thereon; and a lever means rotatably connected to said nut and operable in response to said torsional force to cause said movement of said roller band.

* * * * *